Oct. 29, 1929.   H. B. COLLINS   1,733,448
LOG METERING APPARATUS
Filed May 18, 1927   7 Sheets-Sheet 1

Fig.1.

INVENTOR
Harold B. Collins
BY
Cyrus N. Anderson
ATTORNEY

Oct. 29, 1929.  H. B. COLLINS  1,733,448
LOG METERING APPARATUS
Filed May 18, 1927  7 Sheets-Sheet 2

INVENTOR
Harold B. Collins
BY
Cyrus N. Anderson
ATTORNEY

Oct. 29, 1929.　　　　H. B. COLLINS　　　　1,733,448
LOG METERING APPARATUS
Filed May 18, 1927　　　7 Sheets-Sheet 3

INVENTOR
Harold B. Collins
BY
Cyrus V. Anderson
ATTORNEY

Oct. 29, 1929.     H. B. COLLINS     1,733,448
LOG METERING APPARATUS
Filed May 18, 1927     7 Sheets-Sheet 4

INVENTOR
Harold B. Collins
BY
Cyrus N. Anderson
ATTORNEY

Oct. 29, 1929.    H. B. COLLINS    1,733,448
LOG METERING APPARATUS
Filed May 18, 1927    7 Sheets-Sheet 5

Fig. 7.

INVENTOR
Harold B. Collins
BY
Cyrus N. Anderson
ATTORNEY

Oct. 29, 1929.  H. B. COLLINS  1,733,448
LOG METERING APPARATUS
Filed May 18, 1927   7 Sheets-Sheet 6

Fig. 8.

INVENTOR
Harold B. Collins
BY
Cyrus N. Anderson
ATTORNEY

Oct. 29, 1929.  H. B. COLLINS  1,733,448
LOG METERING APPARATUS
Filed May 18, 1927  7 Sheets-Sheet 7

INVENTOR
Harold B. Collins
BY
Cyrus M. Anderson
ATTORNEY

Patented Oct. 29, 1929

1,733,448

UNITED STATES PATENT OFFICE

HAROLD B. COLLINS, OF PHILADELPHIA, PENNSYLVANIA

LOG-METERING APPARATUS

Application filed May 18, 1927. Serial No. 192,356.

My invention relates to apparatus or means which is adapted to be employed for determining the cubical contents of logs of wood. An apparatus of this kind is of particular utility in ascertaining the cubical contents of logs which may be employed in the manufacture of pulp employed in the production of paper and similar products.

Heretofore the practice has been to pile these logs together and then more or less roughly measure the pile or piles and from the measurements obtained compute the cubical contents thereof. This practice requires considerable time and furthermore is more or less inaccurate in its results.

The general object of the present invention is to provide an apparatus for the purposes indicated of novel construction having means whereby the cubical contents of each log may be ascertained quickly and with substantial accuracy.

It also is an object of the invention to provide an apparatus having means of novel construction which, when a log is conveyed through the apparatus, is actuated and controlled by the log itself to effect computation of the cubical contents thereof.

I shall not at the present time undertake to enumerate and point out all of the objects and advantages incident to the invention, but others of its objects will be referred to in the detailed description thereof which follows or will become apparent from such description.

In order that the invention may be readily understood and its practical advantages appreciated reference may be had to the accompanying drawings in which I have illustrated one convenient mechanical embodiment thereof. However, it will be understood that the invention is susceptible of embodiment in machines or apparatus of other construction within the scope of the claims and that changes in the details of construction may be made without departing from the principle of the invention.

In the drawings:

Fig. 3$^a$ is a sectional top plan view taken on the line 3$^a$—3$^a$ of Fig. 2.

Fig. 5$^a$ is a vertical sectional view taken on the line 5$^a$—5$^a$ of Fig. 5;

Before proceeding with a description in detail of the construction embodying the invention as disclosed in the drawings I shall refer briefly to the general operation of the apparatus in use.

The logs of which the cubical contents are to be computed are deposited on an endless traveling chain of usual construction and are drawn thereby through the portion of the apparatus which contains means or mechanism, which is set in operation by the passage of the logs therethrough, for computing the cubical contents thereof. This mechanism comprises a registering instrument including a "Veeder" counter, the latter being of known construction. The logs, as they pass through the portion of the apparatus including the computing means, contact or engage with devices which effect movement thereof to cause operation of the counting mechanism.

Figure 1:
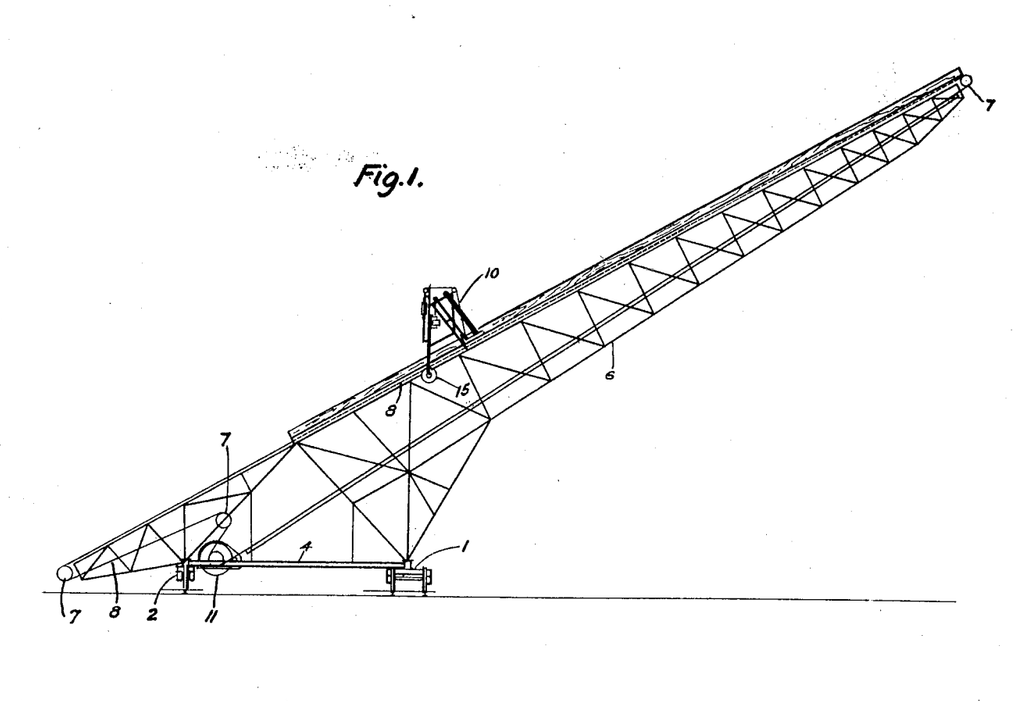
Fig. 1 is a view in side elevation showing in outline a more or less diagrammatic construction embodying the invention, certain parts of the structure being omitted.

In Fig. 1 of the drawings I have shown the apparatus as a whole in more or less diagrammatic form for the purpose of indicating the relation of the various parts thereof to each other. The apparatus is supported upon four and two wheeled trucks 1 and 2 mounted upon tracks 3 in order that it may be shifted readily from one position to another. Mounted upon the trucks 1 and 2 is a horizontal frame structure 4 upon which is mounted and supported an inclined frame structure or boom 6 provided with supporting guide sprocket wheels 7 about which an endless sprocket chain 8, indicated by a line in said Fig. 1, travels. The said chain is provided with outwardly extending diverging arms 9, shown in subsequent figures of the drawings but not shown in Fig. 1, by which the logs, the cubical contents of which are to be computed, are carried along the runway at the bottom of which the chain is supported. The logs having been placed upon this chain are conveyed through the computing mechanism of the apparatus indicated as a whole at 10. The said mechanism is mounted upon the frame structure 6 as is clearly indicated in Fig. 1.

The chain is driven by power applied by belt or otherwise to the wheel 11 upon the shaft of which one of the sprocket wheels 7 is mounted.

Figure 4:
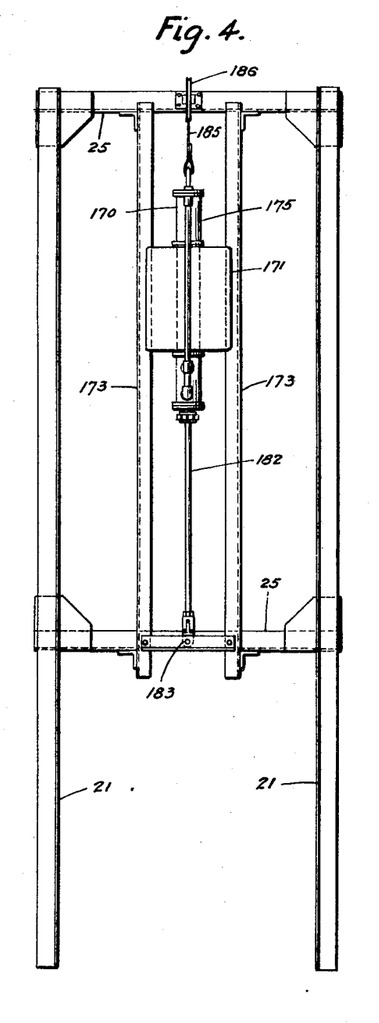
Fig. 4 is a view in elevation of a portion of the structure shown in Fig. 2, the said view being taken looking in the direction of the arrows 4—4 in Fig. 2.
Figure 5:
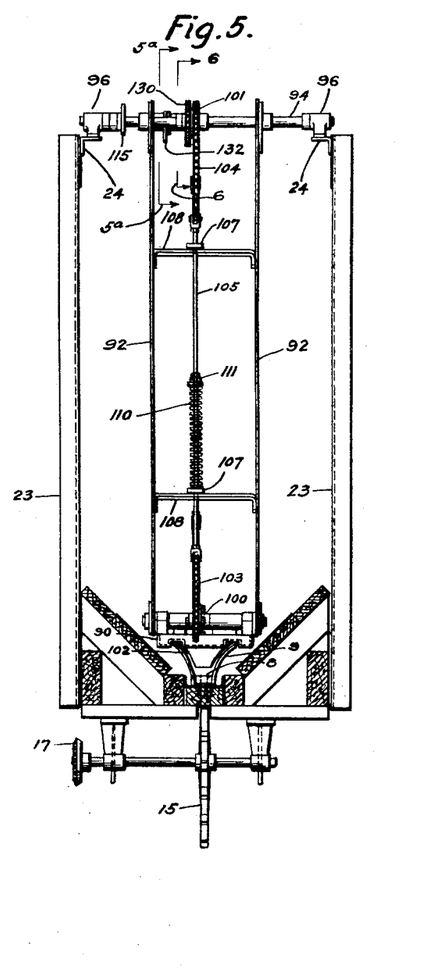
Fig. 5 is a view in sectional elevation taken along the line 5—5 of Fig. 2.
Figure 5A:
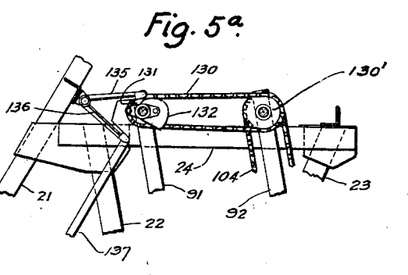
Figure 6:
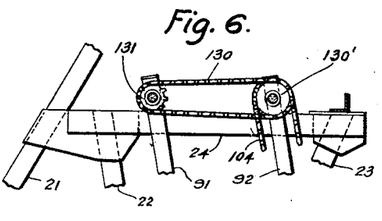
Fig. 6 is a vertical sectional view taken along the line 6—6 of Fig. 5 showing in more or less skeleton form portions of the mechanism, other portions thereof being omitted.
Figure 7:
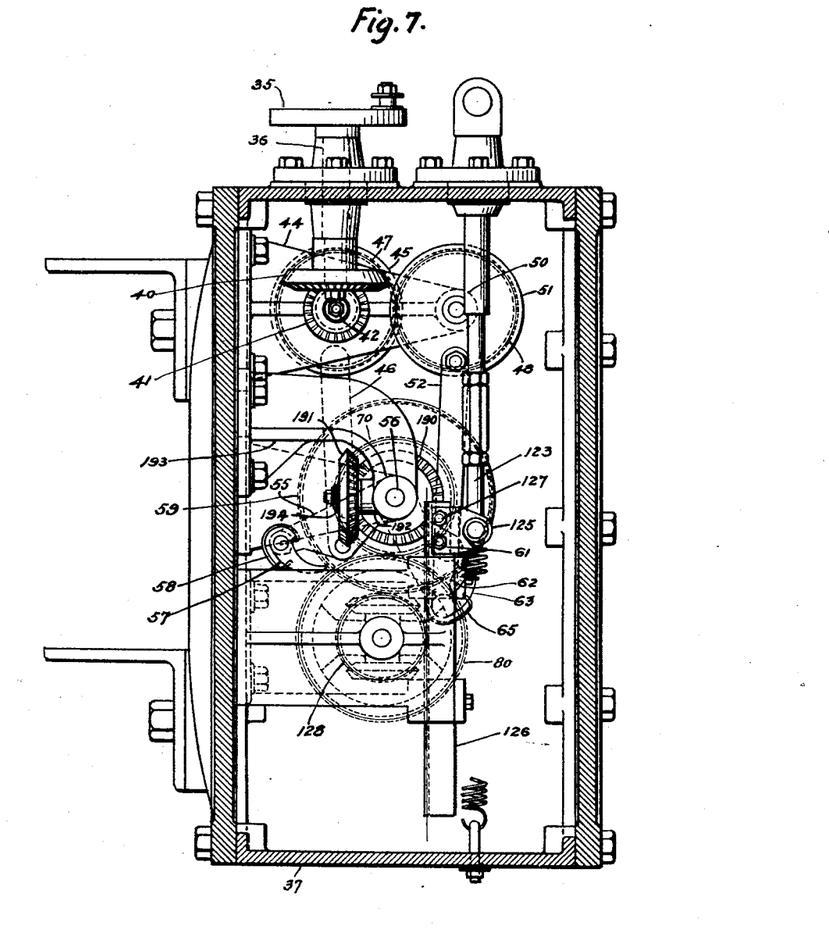
Fig. 7 is a view in sectional elevation taken along the line 7—7 of Fig. 8.

The sprocket chain 8 also travels over and drives a sprocket wheel 15, mounted in a bearing provided in a bracket 16 supported by and depending from a member at the upper side of the frame structure 6. This shaft is provided at one end as indicated with a bevel gear 17 which engages a bevel pinion 18 mounted upon the lower end of a shaft 19 which, when the computing mechanism 10 is supported as shown in Fig. 1 of the drawings, extends upwardly in a practically vertical direction. At its lower end the said shaft is mounted in a bearing 20 supported upon the lower end of one of the angle members 21 constituting parts of the frame structure of the computing mechanism, other parts of the said frame structure being indicated at 22, 23 and 24. The angles 21 are connected together by spaced cross bars 25 as shown in Fig. 4 of the drawings. The upper end of the shaft 19 is journaled in a bearing at 30 provided in a bracket supported upon the same member 21 as that upon which the bearing 20 is supported. The upper end of the shaft 19 is provided with a crank disk 31 connected by means of a crank pin at 32 to one angle of a triangular non-dead center connecting bar indicated as a whole at 33. The device 33 is connected at another of its angles to an idler crank disk 34 and at its third angle to the crank of a crank disk 35 mounted upon the upper end of a shaft 36 which extends downwardly through the top of the casing 37 of a portion of the computing mechanism.

The shaft 36 is provided upon its lower end with a bevel gear 40 which meshes with a bevel pinion 41 upon a horizontal shaft 42 mounted in a bearing 43 provided in a bracket 44 supported upon the inner rear side of the casing 37, previously referred to. The opposite end of the shaft 42 is provided with a crank disk 45 to which the upper end of a connecting rod 46 is connected. The crank disk 45 is provided with a hub at its center upon which a gear 47 is mounted and secured to rotate therewith. The said gear meshes with a gear 48 mounted upon a shaft 49 supported in a bearing 50 at the outer end of the bracket 44. A crank disk 51 is mounted upon the opposite end of the shaft 49 and is secured to rotate therewith. The upper end of a connecting rod 52 is connected to the crank disk 51. It will be understood that in the operation of the apparatus the sprocket wheel 15 rotates continuously and effects continuous rotation of the shaft 19. This continuous operation is transmitted to the bevel gear 40 and thence to other parts of the mechanism. The lower end of the connecting rod 46 is pivotally connected to an arm 55 pivoted on a shaft 56. The outer end of the said arm 55 is provided with a dog 57 pressed inwardly by means of a spring 58. The said dog is adapted to engage with the teeth of a ratchet wheel 59 also mounted upon and keyed to the shaft 56. The lower end of the connecting rod 52 is connected at 61 to an arm 62 also pivoted upon the shaft 56. The said arm 62 is provided with a dog 63 which is adapted to engage the ratchet teeth of the ratchet wheel 64 mounted upon and keyed to the shaft 56. The dog 63 is pressed inwardly by means of a spring 65. A gear wheel 70 is mounted upon the shaft 56 intermediate the ratchet wheels 59 and 64 and is adapted to be rotated independently of the said shaft. Mounted upon the opposite sides of the said gear 70 are masks or protecting plates 71 and 72, portions of the peripheries of which, as indicated at 73 and 74, project beyond the adjoining portions of the peripheries of the ratchet wheels 59 and 64. Normally, that is, when no log is passing through the mechanism the portions of the masks or protecting plates 71 and 72 which project beyond the peripheries of the ratchet wheels 59 and 64 occupy positions to prevent the dogs 57 and 63 from engaging the teeth of the said ratchet wheels. Other portions 75 and 76 of the peripheries of the masks or protecting plates 71 and 72 are located below the corresponding portions of the peripheries of the ratchet wheels 59 and 64. When the connecting rods 46 and 52, previously referred to, are actuated they effect oscillatory movements of the arms 55 and 62 and when the masks or protecting plates 71 and 72 are adjusted into proper positions the dogs 57 and 63 upon the said arms engage the teeth of the ratchet wheels 59 and 64 and effect step by step movement thereof causing a corresponding or like movement of the shaft 56 to which the said ratchet wheels are keyed.

Figure 8:
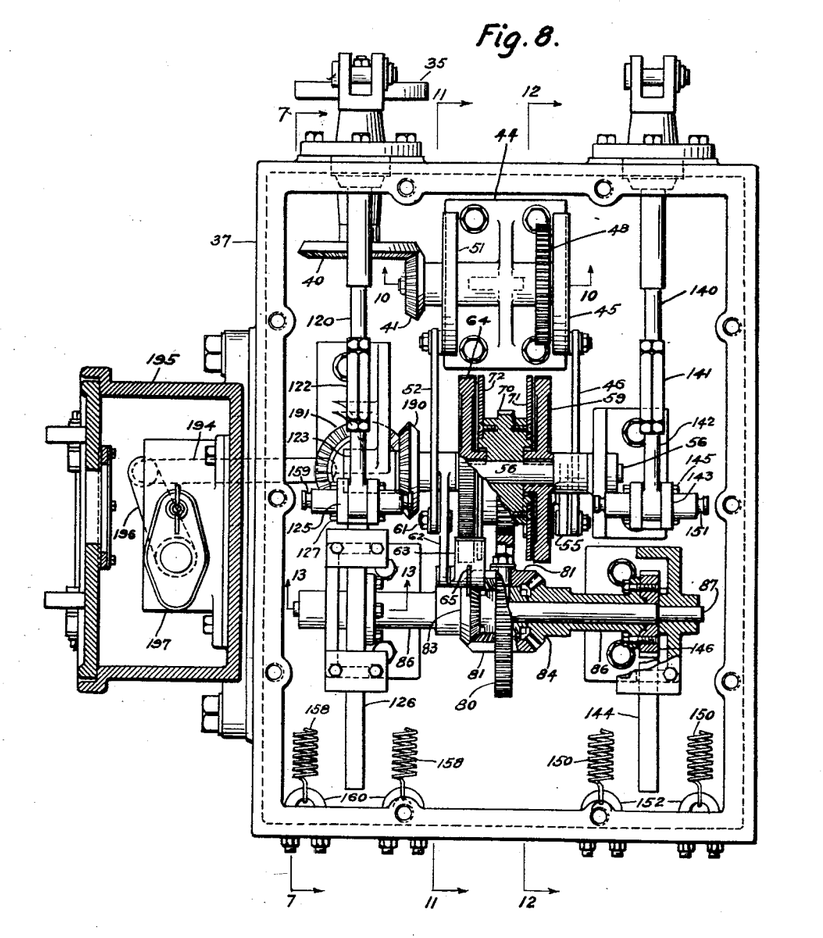
Fig. 8 is a view looking toward the left in Fig. 7 with the cover of the box shown in Fig. 7 removed and with certain parts of the mechanism shown in section.
Figure 9:
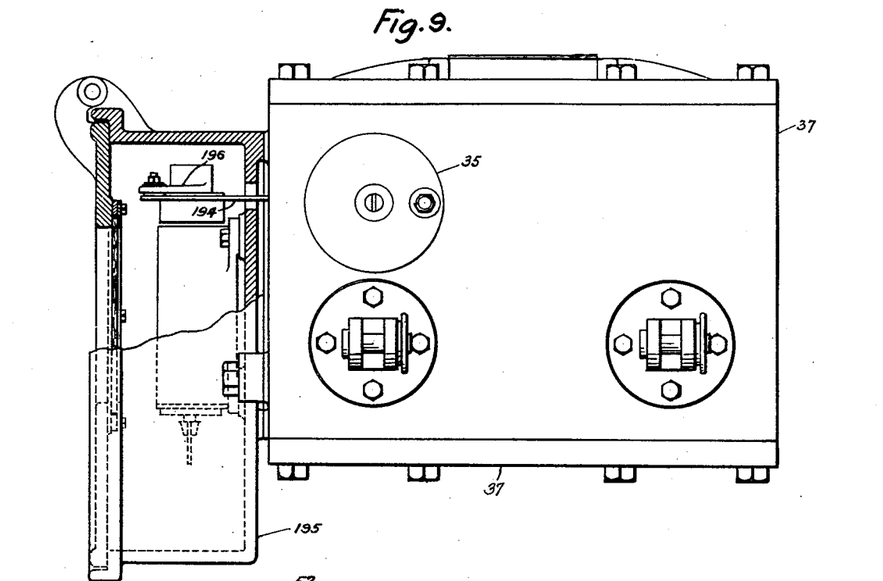
Fig. 9 is a view partly in top plan and partly in section of the structure shown in Fig. 8.
Figures 10, 11, 12, 13:
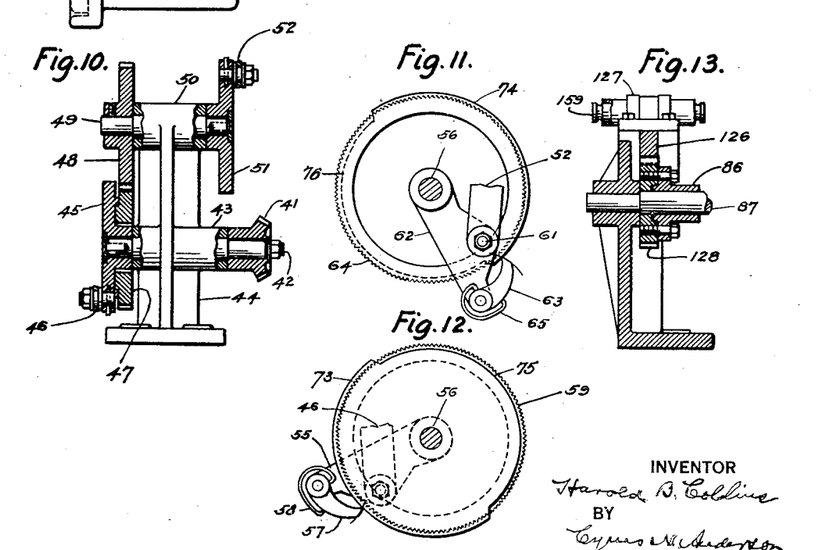
Fig. 10 is a sectional plan view taken along the line 10—10 of Fig. 8.
Fig. 11 is a view in section taken in the plane 11—11 of Fig. 8 and showing a fragmentary portion of the structure.
Fig. 12 is a similar view taken in the plane 12—12 of Fig. 8, said view, as well as Fig. 11, being for the purpose of showing the relationship to each other of the parts depicted therein.
Fig. 13 is a horizontal sectional view taken on the line 13—13 of Fig. 8.

As has been indicated already, adjustment of the masks or protecting plates 71 and 72 is effected by rotation of the gear 70 rotatably mounted upon the shaft 56. Rotation of the said gear is effected by means of the gear 80 constituting part of a differential gear mechanism shown in Fig. 8 of the drawings. This differential gear mechanism is of known construction and need not be described in detail. It comprises intermediate bevel gears 81 upon which the gear 80 is mounted. These bevel gears are rotatable about axes extending at right angles to the axis of the gear 80. The said gears 81 are in mesh with bevel gears 83 and 84 at the inner ends of sleeve-like members 86 mounted in spaced relation to each other upon a shaft 87, as is clearly shown in Fig. 8 of the drawings.

The sleeves 86 together with the bevel gears thereon are independently rotatable, and their rotation is dependent upon the passage of a log through the apparatus. The rotation of the sleeves 86 together with the bevel gears thereon operates to set the masks or protecting plates 71 and 72, to which reference has been made previously.

Rotation of the said sleeves is dependent upon the passage of logs through the apparatus which is constructed so as to operate upon logs ranging from a minimum diameter of four inches upward.

Assuming that a log of greater diameter than four inches is conveyed by the conveyor chain 8 through the apparatus its forward end will first contact with the rear or inner end of a contact plate 90 pivotally connected with the lower ends of parallel bars 91 and 92. The bars 91 and 92 are suspended from shafts 93 and 94 supported in bearings 95 and 96 upon the angles 24 of the frame structure. The upper ends of the said bars 91 and 92 are keyed to the shafts 93 and 94 so that when the said bars are swung in one direction or the other partial rotation of the said shafts 93 and 94 is effected.

Shafts 97 and 98 extend transversely of and are mounted upon the lower ends of the bars 91 and 92.

Figures 2, 3:
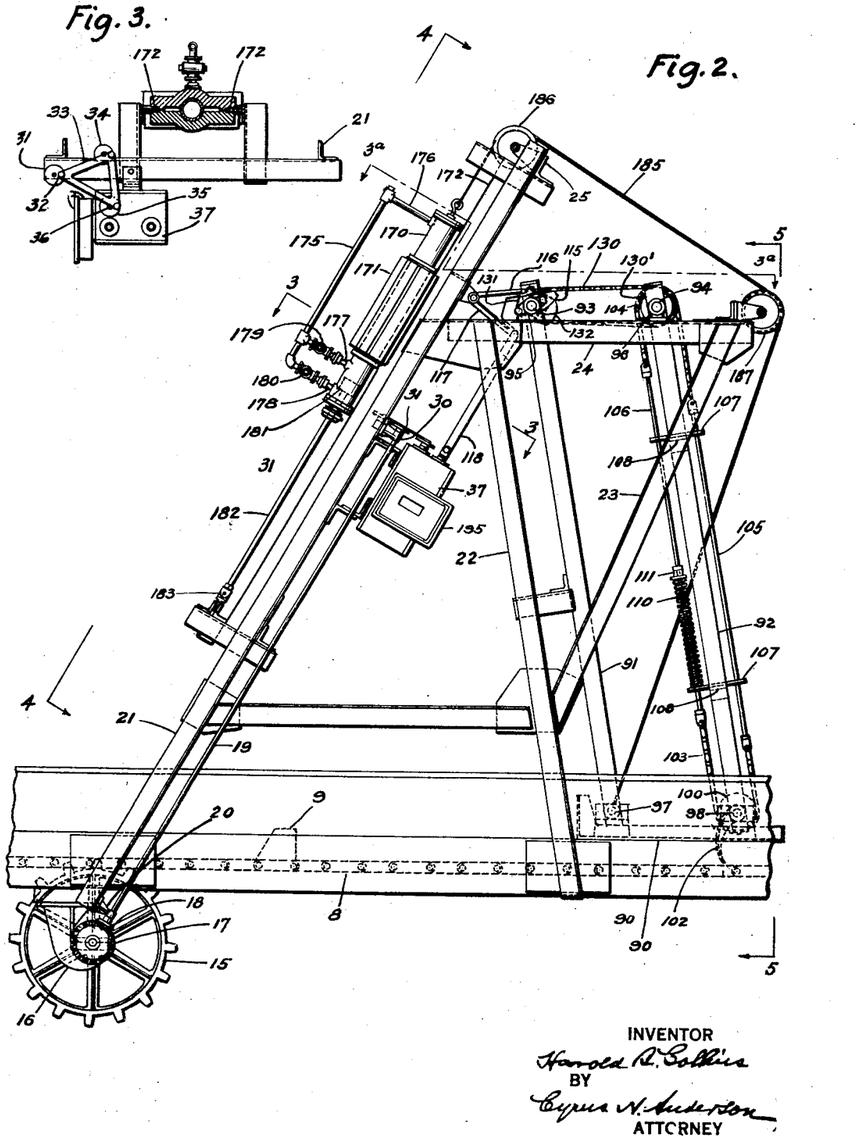
Fig. 2 is a view in side elevation of the essential part of the structure embodying the invention.
Fig. 3 is a transverse sectional view taken on the line 3—3 of Fig. 2.
Figure 3A:
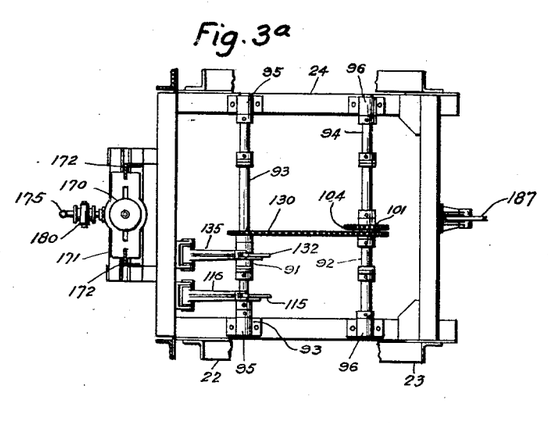
Figure 14:
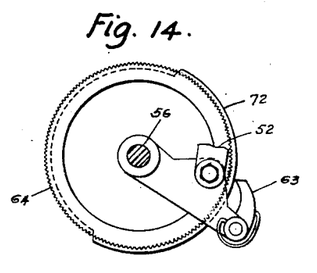
Figs. 14 and 15 are views taken in the same plane as Fig. 11 but in which the parts are shown in different positions.

A sprocket wheel 100 is mounted loosely upon the shaft 98 and a corresponding sprocket wheel 101 is mounted loosely upon the shaft 94, the said sprocket wheels being rotatable on their respective shafts. When a log strikes the rear or inner end of the contact plate 90 the parallel bars 91 and 92 are swung to the right, but such movement does not cause rotation of the sprocket wheel 100. However, after the log has moved a certain distance it passes underneath the contact plate 90 and its forward end strikes the trigger 102 which is mounted loosely upon the shaft 98 and is connected to the sprocket wheel 100. The trigger 102 projects down through an opening in the contact plate 90 and rearward swinging movement of the said trigger is limited by the contact thereof with the inner edge of the said opening, as will be apparent from an inspection of Fig. 2 of the drawings. The contact of the log with the trigger 102 causes rotation thereof in an anti-clockwise direction, having reference to Fig. 2 of the drawings, which causes rotation of the sprocket 100 in a like direction. Such rotation is transmitted to the sprocket wheel 101 by means of a sprocket chain 103 which engages the sprocket 100; a sprocket chain 104 which engages the sprocket wheel 101; and connecting rods 105 and 106 the opposite ends of which are connected to the ends of the sprocket chains 103 and 104, as shown. The rods 105 and 106 are guided through holes in guide plates 107 which are supported upon cross bars 108 between the parallel bars 92. The sprocket chains and connecting rods are held in normal or initial position by means of a spring 110 coiled around the connecting rod 106. The upper end of said spring bears against a stop sleeve 111 upon the said rod while the opposite end thereof presses against the upper side of the lower guide plate 107. The spring is compressed so that it tends to cause upward movement of the rod 106 and downward movement of the rod 105. Such movements when effected by the spring 110, as when a log passes from underneath the trigger 102, cause rotation of the sprocket wheel 100 to return the trigger to normal or depending position as shown in Fig. 2 of the drawings and at the same time causes reverse rotation of the sprocket wheel 101 to its normal or initial position. When the parallel bars 91 and 92 are swung forwardly, or to the right, having reference to Fig. 2 of the drawings, the shaft 93 is rotated in an anti-clockwise direction. A cam member 115 is mounted upon the shaft 93 and rotates therewith. The upper or right hand end thereof contacts with the outer or forward swinging end of the upper arm 116 of a bell crank lever the other arm 117 of which is connected to the upper end of a link 118 the lower end of which is connected to the upper end of a rod which effects initial setting of the masks or protecting plates 71 and 72. The said rod comprises a portion 120 the lower end of which is connected with a turnbuckle or other adjusting device 122. The lower end of the latter is connected with a section of rod 123 to the lower end of which ears 125 are connected. These ears are in spaced relation to each other as shown. A rack bar 126 is connected at its upper end to these ears by means of bolts 127. The said rack bar is in engagement or mesh with a rack gear 128 mounted upon one of the sleeves 86. When the cam 115 contacts with the bell crank lever and causes upward pivotal movement thereof upward movement of the connecting rod 118 is effected, which movement through the connections described causes movement of the rack bar 126 to cause rotation in an anti-clockwise direction of the sleeve 86 upon which the bevel gear 83 is mounted. During the rotation of this gear the gear 84 upon the opposing sleeve 86 is held against rotation. Rotation of the gear 83 effects rotation and traveling movement of the gears 81 about the gear 84 which at such time is held stationary. Such movement of the bevel gears 81 effects rotation of the gear 80 which in turn causes rotation of the gear 70 in a clockwise direction thereby rotating the masks or protecting plates 71 and 72 with respect to the ratchet wheels 59 and 64. This movement of these masks or protecting plates may be referred to as a "setting movement" thereof because the extent of such movement depends upon the size of the log which may have been caused to contact with the contact plate 90 to effect swinging movement of the parallel bars 91 and 92. The plate 72 is shown in "set" position in Fig. 14 of the drawings. The construction and operation of the mechanism intermediate the contact plate 90 and the plates 71 and 72 are such that the extent of rotative or angular movements of said plates is proportional to the square of the diameter of the logs which are conveyed through the machine and which engage the said contact plate 90 to actuate the same. The "setting" movement described is entirely independent of the movement effected by the operation of the trigger 102. When the latter is operated the connection, comprising the sprocket chains 103 and 104 and the rods 105 and 106, is actuated whereby rotation of the sprocket wheel 101 is effected in anti-clockwise direction. A sprocket chain 130 is driven by a sprocket wheel 130' which is connected to and rotates with the sprocket wheel 101. The said chain engages a sprocket wheel 131 mounted to rotate upon the shaft 93. Hence driving of the sprocket chain 130 from the sprocket wheel 101 effects rotation of the sprocket wheel 131 together with the sleeve upon which the latter is carried. A cam 132 mounted upon and carried by the said sleeve contacts with the outer end of the upper arm 135 of a bell crank lever pivoted at its angle to a lug or projection upon a stationary part of the frame structure of the apparatus. The other lower arm 136 of the said bell crank lever is connected with the upper end of a connecting rod 137 the lower end of which is connected with a rod 140 which extends downwardly through the top of the casing 37. The lower end of said rod 140 is connected with a turn buckle or other adjusting device 141 and the lower end of the latter is connected to the upper end of a section of rod 142 to the lower end of which ears 143 are connected. A rack bar 144 is connected to these ears by means of bolts 145. The said rack bar is in engagement with a gear 146 which is connected with the outer end of the adjoining sleeve 86 upon the inner end of which the bevel gear 84 is mounted.

Figure 15:
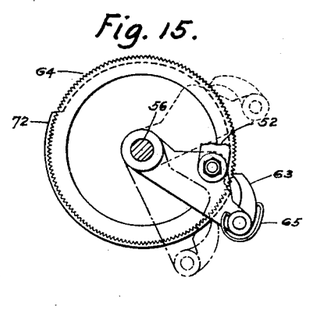

It will be seen, therefore, that when the trigger 102 is actuated the connections between the same and the rod comprising the parts 140, 141, etc., effect upward sliding movement of the latter. Such movement causes further movement or rotation of the gear 80 in the same direction as that in which it was previously rotated by means of the rack bar 126. Actuation of the gear 80 by means of the rack bar 141, as just described, operates to effect a final setting movement of the masks or protecting plates 71 and 72. The plate or mask 72 is shown in Fig. 15 in such final set position. It will be apparent that the positions in which these protecting plates 71 and 72 are set is dependent entirely upon the size of the log which may be passing underneath the contact plate 90. The positions of these protecting plates control the extent of rotation of the ratchet wheels 59 and 64 and the shaft 56 on which they are mounted during the period that a log is traveling underneath the contact plate 90. It will be recalled that the arms 55 and 62 upon which the dogs 57 and 63 are mounted are being oscillated continuously and when the portions of the ratchet wheels 59 and 64 over which the said dogs are reciprocated are uncovered the said dogs engage the said ratchet wheels to cause rotation thereof. It is apparent, therefore, that the extent of rotation of the said wheels will depend upon the extent of the peripheral portions thereof which are uncovered so as to permit the dogs to engage the same. Immediately upon the passage of a log beyond the trigger 102 the spring 110 operates to return the same to the depending normal position shown in Fig. 2 of the drawings. Such movement through the sprocket chain 130 returns the rack bar 144 to initial normal position causing movement of the gear 146 in a reverse direction which in turn effects movement of the gear 80 in a reverse direction effecting a corresponding reverse movement of the protecting plates 71 and 72 toward their initial normal position. Such movement, in a downward direction, of the rack bar 144 is effected by tensioned springs 150 the upper ends of which are connected to the outer ends of the projections 151 mounted upon the ears 143, while the lower ends of which are connected to stationary yokes 152.

Immediately the rear end of the log has passed from underneath the contact plate 90 the latter, together with the parallel bars 91 and 92, swings back into normal position. Such movement effects or causes reverse rotation of the shaft 93 with the cam 115 thereon which releases the bell crank lever comprising the arms 116 and 117. Upon such release coiled springs 158, the upper ends of which are connected to the outer ends of projections 159 and the lower ends of which are connected to yokes 160, operate to cause downward movement of the rack bar 126 to effect rotation of the bevel gear 83 to complete the reverse movement of the gear 80 to return the protecting plates 71 and 72 to their initial or starting position. The yokes 152 and 160 are connected to the bottom of the casing 37.

In order to prevent the contact plate 90 and the bars 91 and 92 and the parts associated therewith from swinging back with too great force I have provided a cushioning means comprising a cylinder 170 upon which weights 171 are clamped. The opposite edges of these weights are spaced to provide grooves which are engaged and guided by the inwardly extending flanges 172 of the intermediate upright angle bars 173 connected to their opposite ends to the cross bars 25. The opposite ends of the cylinder 170 are in communication through a pipe 175 located outside of the said cylinder. At its upper end the said pipe is provided with a single connection 176 which communicates with the interior of the said cylinder while at its lower end the said pipe comprises two connections 177 and 178 in spaced relation to each other which are in communication with the interior of the said cylinder. These connections are adapted to be closed by means of valves 179 and 180. A piston indicated by dotted lines at 181 operates in the cylinder 170. The said piston is provided with openings, not shown, therein through which oil or other fluid located within the cylinder 170 is adapted to pass. The piston remains stationary but the cylinder 170 is adapted to reciprocate thereon and relatively thereto. The piston is provided with a connecting rod 182, the lower end of which is anchored at 183 as indicated in Figs. 2 and 4 of the drawings. The piston 181 operating in the cylinder 170 constitutes a means for governing the speed of movement of the cylinder 170 with the weight 171 thereon. The upper end of the cylinder 170 is connected to a rope, preferably of wire, 185 which travels over sheaves 186 and 187 which are mounted upon the stationary frame structure of the apparatus as shown in Fig. 2 of the drawings. The opposite lower end of the said rope 185 is connected to the cross shaft 97 at the lower ends of the parallel bars 91. When the parallel bars together with the contact plate 90 are swung or moved outwardly by the contact of a log with the said contact plate the cylinder 170 with the weight 171 thereon moves downwardly. When the contact plate is released by the passage of a log from underneath the same the parallel bars with the parts supported thereby swing under the influence of gravity back into normal position which is shown in Fig. 2 of the drawings. The rapidity of speed of such return or reverse movement is controlled by the speed with which the cylinder and weight 171 are permitted to move with respect to the piston 181. The device comprising the parts 170, 171, 181, etc. may be described as a governor for controlling the speed of the descending movements of the parallel bar structure upon which the contact plate 90 is supported.

The rotation of the ratchet wheels 59 and 64, as previously described, causes rotation of the shaft 56 upon one end of which a bevel gear 190 is mounted. The said bevel gear is in engagement or mesh with a bevel gear 191 which is supported upon a stud or projection 192 extending rearwardly from the inner lower end of the bracket 193 supported upon the rear wall of the casing 37. A link or connecting bar 194 is connected at one end to one side of the said gear 191. Said link extends through the adjoining side wall of the casing 37 into a box 195 mounted upon the said wall. The end of the said connecting link which extends into the said box is connected to an arm or lever 196 constituting a part of a "Veeder" counting mechanism indicated as a whole at 197. The said counting mechanism is in commercial use and consequently a detailed description thereof is not necessary.

The relation and proportion of the mechanism, the operation of which is dependent upon the passage of a log underneath the contact plate 90 to effect tripping or operating of the trigger 102, are such that one complete revolution of the gear 191 is effected for each one-tenth of a cord of wood or logs which passes through the apparatus. One complete revolution of the gear 191 effects one complete oscillation of the lever or arm 196 whereby the counting of the logs or wood in tenths of cords and cords is effected.

As has been indicated already, the apparatus is designed to measure the cubical contents of logs ranging from four inches in diameter as a minimum upwards. When a log having the minimum diameter of four inches is caused to travel through the machine it does not contact with the contact plate 90 but it does contact with the trigger 102 and through the mechanism interposed between the said trigger and the masks or protecting plates 71 and 72, sets the latter in position with respect to the ratchet wheels 59 and 64 to permit the dogs 57 and 63 to engage the said ratchet wheels to effect rotation thereof through an extent sufficient to effect computation of the cubical contents of a log of such diameter.

It will be noted that the arms 55 and 62 carrying the dogs 57 and 63 are so related to each other and to the ratchet wheels 59 and 64 that the said dogs operate alternately to effect step by step movement of the said wheels together with the shaft 56 upon which the said wheels are mounted and to which they are keyed.

It will be seen that by my invention I have provided an apparatus having means which is adapted to ascertain and compute the cubical contents of logs as they are conveyed through the said apparatus. The ascertaining and computing of the contents of the respective logs as they are conveyed through the apparatus are effected automatically with an accuracy sufficient from a practical standpoint. If the logs were regular and of symmetrical form or outline the cubical contents thereof would be ascertained with substantial accuracy but the presence of irregularities therein and of knots and limbs thereon is likely to prevent a completely accurate ascertainment of the exact measurements of the logs. But the inaccuracy which may result from such lack of symmetry and form in the logs and the presence of knots, limbs and the like may be disregarded in practice.

Although my invention has been illustrated and described as embodied in a machine for measuring or metering logs for the purpose of ascertaining the cubical contents thereof it is to be understood that it may be embodied in machines adapted for metering or measuring other objects of suitable dimensions and shapes.

Having thus described by invention, what I claim and desire to secure by Letters Patent is:

1. In a machine of the character described, the combination of means for conveying a log therethrough, a contact member swinging movement of which is adapted to be effected by contact of the log therewith as it is conveyed through the said machine, computing mechanism comprising a counter and actuatable members for operating said counter, means for actuating said members, rotatable means for shielding portions of the said actuatable members from the action of said means, and means interposed between the said contact member and the said shielding means for effecting rotative movements of the said shielding means through distances proportional to the extent of movement of the said contact member.

2. In a machine of the character described, the combination of means for conveying a log through the said machine, a contact member with which the said log is adapted to contact to effect swinging movement thereof, computing mechanism comprising a counter, actuatable members for effecting operation of said counter, connections interposed between the said conveying means and the said actuatable members for actuating the latter, means for shielding portions of the said actuatable members from the action of said connections for controlling the operation thereof, and means interposed between the said contact member and the said shielding means for effecting adjustments of the latter through distances proportional to the extent of the swinging movement of the said contact member.

3. In a machine of the character described, the combination of means for conveying a log through said machine, a contact member with which the said log is adapted to contact, means for swingingly supporting the said contact member whereby when a log contacts therewith in its passage through the said machine swinging movement thereof is effected, computing mechanism comprising a counter, actuatable means for operating said counter, means for actuating said actuatable means, adjustable means for shielding portions of said actuatable means against the action of the said last mentioned means, and connections between the said contact device and the said adjustable shielding means, the said connections including means whereby upon swinging movement of the said contact device adjustment of the said shielding means is effected.

4. In a machine of the character described, the combination of means for conveying a log through said machine, a contact member, means for swingingly supporting the said contact member whereby upon contact therewith by a log swinging movement thereof is effected, computing mechanism comprising a counter and actuatable means for operating said counter, connections interposed between the said conveying means and the said actuatable means which are adapted to actuate the latter, means for shielding portions of the said actuatable means from the action of said connections, connections between the said contact member and the said shielding means for adjusting the latter when the said contact member is swung by the contact of a log therewith, and other means adapted to be actuated by the passage of the said log for effecting further adjustments of the said shielding means.

5. In a machine of the character described, the combination of means for conveying an object therethrough for ascertaining the cubical contents thereof, a pivoted spring controlled device with which the said object is adapted to contact in its passage through the said machine to effect pivotal movement of said device, computing mechanism comprising a counter and actuatable means for operating said counter, means for actuating said actuatable means, means for shielding portions of said actuatable means from said actuating means, and connections between the said spring controlled pivoted device and the said shielding means for adjusting the latter with relation to the said actuatable means to permit actuation thereof by the actuating means therefor.

6. In a machine of the character described, the combination of means for conveying an object therethrough the cubical contents of which are to be ascertained, depending bars pivoted at their upper ends, a contact device supported upon the lower ends of said bars with which device the said object is adapted to contact as it is conveyed through the said machine to effect outward swinging movement of the said device, computing mechanism comprising a counter and actuatable means for operating said counter, means for actuating said actuatable means, means for shielding portions of said actuatable means from said actuating means, connections between the said bars and the said shielding means whereby the said pivotal movement of the said bars causes movements of the said shielding means to vary the position thereof with respect to the said actuatable means, and means for controlling the return swinging movement of the said contact device and the bars by which it is supported.

7. In a machine of the character described, the combination of means for conveying a log through the said machine, parallel bars, rotatable shafts to which the upper ends of said bars are connected and from which they are suspended, one of the said shafts being keyed to the bars supported thereby, a contact device connected to the lower ends of said parallel bars, said device being located in the path of said log and adapted to be swung outwardly upon contact of a log therewith, such outward swinging movement causing partial rotative movement of the shaft to which the upper ends of certain of said bars are keyed, computing mechanism comprising a counter and actuatable means for operating said counter, means for actuating said actuatable means, means for shielding portions of said actuatable means to prevent the action of said actuating means thereon and to control the actuation thereof, and means interposed between the said last mentioned shaft and the said shielding means whereby rotation of said shaft upon outward swinging movement of the said contact device effects a "setting" movement of the said shielding means.

8. In a machine of the character described, the combination of means for conveying a log through the said machine, parallel bars, rotatable shafts to which the upper ends of said bars are connected and from which they are suspended, one of the said shafts being keyed to the bars supported thereby, a contact device connected to the lower ends of said parallel bars, said device being located in the path of said log and adapted to be swung outwardly upon contact of a log therewith, such outward swinging movement causing partial rotative movement of the shaft to which the upper ends of certain of said bars are keyed, computing mechanism comprising a counter and actuatable means for operating said counter, means for actuating said actuatable means, means for shielding portions of said actuatable means from the action of said actuating means thereon to prevent and to control the actuation thereof, means interposed between the said last mentioned shaft and the said shielding means whereby rotation of said shaft upon outward swinging movement of the said contact device effects a "setting" movement of the said shielding means, and means adapted to be actuated by the said log upon the passage thereof underneath the said contact device to effect further movements of the said shielding means.

9. In a machine of the character described, the combination of means for conveying a log therethrough to be metered, computing mechanism, means actuated by said first named means for actuating said mechanism, means for normally preventing the actuation of said mechanism by said second named means, and means connected to said last named means adapted to be actuated by the passage of a log through the said machine for controlling the operation of said computing mechanism by said second named means.

10. In a machine of the character described, the combination of means for conveying a log through the said machine to be metered, bars supported at their upper ends and terminating at their lower ends in operative relation to the path of travel of said log, shafts from which the said bars are suspended and upon which they are supported, a contact device connected with the lower ends of the said bars with which the said log is adapted to contact whereby outward swinging movement of the said contact device together with the said bars is effected, rotation of one of the said shafts being effected by such outward swinging movement, a cam arm mounted upon said shaft to rotate therewith, computing mechanism comprising a counter and actuatable means for operating said counter, means for actuating said actuatable means, rotatable means for shielding portions of said actuatable means, connections between the said rotatable means and the said cam arm whereby movement of the latter operates to effect partial rotation of the said rotatable means, a cam arm rotatably mounted on the said last mentioned shaft, means adapted to be actuated by the passage of said log through the said machine for effecting rotation of the said rotatable cam arm, and connections between the said rotatable cam arm and the said rotatable means for shielding the said actuatable means whereby upon rotation of said rotatable cam arm further rotation of the said rotatable means is effected.

11. In a machine of the character described, the combination of means for conveying a log therethrough to be metered, computing mechanism, means for causing operation of the said mechanism, the said operating means comprising a contact device swingingly supported and with which a log in its passage through the said machine is adapted to contact to effect swinging movement thereof toward the rear of the machine, the said contact device returning to normal position under the influence of gravity, connections between the said contact device and portions of the said computing mechanism whereby said swinging movement causes the "setting" operation of the said portions of the computing mechanism, retarding means for controlling the speed of return movement of the said contact device to normal position, additional means with which the said log is adapted to contact after its contact with the said contact device to effect actuation thereof, connections between the said additional means and the said portions of the computing mechanism whereby actuation of the said additional means causes further operation of the said portions, and yielding means for automatically returning the said additional means to normal position after the passage of a log from the said machine.

12. In a machine of the character described, the combination of means for conveying a log through said machine to be metered, computing mechanism comprising a counter, a couple of ratchet wheels adapted to be rotated for operating the said counter, a shaft for supporting the said ratchet wheels in spaced parallel relation with respect to each other, plates for shielding portions of the said ratchet wheels, said plates being mounted upon the said shaft and rotatable independently thereof, one of the said plates being located in adjacent relation to one of the said ratchet wheels and the other of said plates being located in adjacent relation to the other of said wheels, a plurality of means with which a log in its passage through the said machine is adapted to contact, said means being thereby actuated, and connections between the last mentioned means and the said shielding plates whereby actuation of the last mentioned means effects adjustment of the said plates with respect to the said ratchet wheels to thereby control the operation thereof.

13. In a machine of the character described, the combination of means for conveying a log through said machine to be metered, computing mechanism comprising a counter, a shaft, a couple of ratchet wheels mounted upon said shaft and connected to rotate therewith, connections between the said conveying means and the said ratchet means whereby traveling movement of said conveying means causes rotative movements of the said ratchet wheels, a couple of plates rigidly connected together and mounted upon the said shaft to rotate independently thereon, the said plates operating to shield portions of the said ratchet wheels to control the operation thereof, means with which a log in its passage through the said machine is adapted to contact, such contact causing movement of said means, and connections between the said means and the said plates whereby movement of said means causes rotative adjustment of the said plates with relation to the said ratchet wheels whereby control of the operation of the latter is effected.

14. In a machine of the character described the combination of means for conveying objects through said machine, computing mechanism for computing the cubic content of said objects as they pass through said machine, means for actuating said mechanism, adjustable means for controlling the operation of said mechanism by said last named means, means adapted to be moved by the objects passing through said machine for initially adjusting said adjustable means, and means for finally adjusting said adjustable means for controlling the operation of said mechanism.

15. In a machine of the character described the combination of means for conveying objects through said machine, computing mechanism, continuously driven means for actuating said mechanism, adjustable means for normally preventing the actuation of said mechanism by said second named means, a member adapted to be moved by the contact therewith of the objects passing through said machine, means operated by said member for initially adjusting said adjustable means, and a second member adapted to be actuated by the said objects to effect further adjustment of said adjustable means.

16. In a machine of the character described the combination of means for conveying objects through said machine, computing mechanism, means for actuating said mechanism, continuously driven means for moving said actuating means step by step, adjustable means for normally preventing the operation of said actuating means by said continuously driven means, a movable member adapted to be contacted by the objects passing through said machine and to operate said adjustable means to permit operation of said actuating means by said driven means, a second movable member adapted to be actuated subsequently to the actuation of said first named member, and means for permitting adjustments of the said adjustable means by said second named member independently of the operation of the said adjustable means by the said first named member to permit further movement of said actuating means by said continuously driven member.

17. In a machine of the character described the combination of means for conveying objects through said machine, computing mechanism and continuously driven actuating means therefor, adjustable means for controlling the operation of said mechanism by said continuously driven means, a member adapted to be actuated by the objects passing through said machine, means operated by said member for initially positioning said adjustable means, and a second member adapted to be moved by the said objects having means connected therewith for effecting further adjustment of said adjustable means independently of the operation of said first named member.

18. In a machine of the character described the combination of means for conveying a log through said machine, computing mechanism, a ratchet wheel adapted to be rotated for operating said mechanism, a shaft for supporting said ratchet wheel, a plate for shielding a portion of the said ratchet wheel, said plate being mounted upon the said shaft and rotatable independently thereof and being located in adjacent relation to said ratchet wheel, means with which a log in its passage through the said machine is adapted to contact, said means being thereby actuated, and connections between the last mentioned means and the said shielding plate whereby actuation of the last mentioned means effects adjustment of the said plate with respect to the ratchet wheel to thereby control the operation thereof.

19. In a machine of the character described the combination of a conveyor for conveying objects through said machine, computing mechanism and means for actuating the same, a ratchet wheel connected to said actuating means, a lever having a dog thereon adapted to engage said wheel, means for continuously oscillating said lever, an adjustable shield for preventing engagement of said dog with the said ratchet wheel, a movable member adapted to be actuated by contact therewith of the objects passing through the said machine, and means connected between the said member and said adjustable shield whereby actuation of said member operates said shield to permit engagement of the said dog with the ratchet wheel to effect operation of the said computing mechanism.

In testimony that I claim the foregoing as my invention, I have hereunto signed my name this 17th day of May, A. D. 1927.

HAROLD B. COLLINS.